(12) United States Patent
Jeon

(10) Patent No.: US 9,134,118 B2
(45) Date of Patent: Sep. 15, 2015

(54) TILT CHECK APPARATUS AND METHOD THEREOF

(71) Applicant: Samsung Electronics Co., Ltd, Suwon-si, Gyeonggi-do (KR)

(72) Inventor: Jin-a Jeon, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 72 days.

(21) Appl. No.: 13/896,648

(22) Filed: May 17, 2013

(65) Prior Publication Data

US 2014/0022538 A1    Jan. 23, 2014

(30) Foreign Application Priority Data

Sep. 17, 2012    (KR) .................. 10-2012-0102987

(51) Int. Cl.
*G01B 11/26*    (2006.01)
*G03B 43/00*    (2006.01)
*G03B 17/12*    (2006.01)

(52) U.S. Cl.
CPC ................ *G01B 11/26* (2013.01); *G03B 43/00* (2013.01); *G03B 17/12* (2013.01)

(58) Field of Classification Search
CPC .......... G01B 11/26; G03B 43/00; G03B 17/12
USPC .......................................................... 356/138
See application file for complete search history.

(56) References Cited

U.S. PATENT DOCUMENTS

2003/0053742 A1*  3/2003  Maruyama ..................... 385/18
2003/0235124 A1*  12/2003  Ohno ......................... 369/53.19
2010/0265808 A1*  10/2010  Yamakawa et al. ........... 369/103

* cited by examiner

*Primary Examiner* — Roy M Punnoose
(74) *Attorney, Agent, or Firm* — Staas & Halsey LLP

(57) ABSTRACT

A tilt check apparatus and a tilt check method are provided. The tilt check apparatus checks a lens module including a sensor and a lens and includes: a light-emitting part which diffuses and outputs light to check a tilt of the lens module; a reflector which reflects the diffused light; an interface which, if the reflected light is sensed by the sensor of the lens module, receives the sensed result from the sensor; and a detector which detects depth information by using the sensed result received through the interface and detects a tilt state between the lens and the sensor based on the depth information. Therefore, efficiency of a tilt check process is improved.

10 Claims, 6 Drawing Sheets

TILT CHECK APPARATUS AND METHOD THEREOF

CROSS-REFERENCE TO RELATED APPLICATIONS

This application claims priority under 35 U.S.C. §119 from Korean Patent Application No. 10-2012-102987, filed on Sep. 17, 2012, in the Korean Intellectual Property Office, the disclosure of which is incorporated herein by reference in its entirety.

BACKGROUND OF THE INVENTION

1. Field of the Invention

The present general inventive concept generally relates to a tilt check apparatus and a method thereof, and more particularly, to a tilt check apparatus used in a tilt evaluation process when a lens and a sensor are assembled, and a method thereof.

2. Description of the Related Art

A digital camera is an apparatus which receives external light through a lens and extracts image data through a sensor by using the received light. Therefore, the lens and the sensor are important elements to the digital camera.

If the lens and the sensor are not assembled well when the digital camera is manufactured, a level between the lens and the sensor is titled. The tilt affects an image quality. Therefore, a tilt degree is evaluated to determine whether the lens and the sensor are normally assembled.

A checker operates and evaluates a lens module, into which the lens and the sensor are assembled, in a live view mode. In other words, the checker measures auto focus (AF) data at corners and in a central area in the live view mode and measures a position of a peak value of the AF data to evaluate the tilt degree. According to this method, if the sensor operates in the live view mode, a resolution is lower, and the AF data has a difference from real AF data. Also, even if a tilt is adjusted by using the peak value of the AF data, an error occurs. In addition, it is difficult to accurately find the position of the peak value of the AF data by continuously driving the sensor in a full size still capture mode. Therefore, there is no method of correcting the error by using the peak value of the AF data.

Therefore, techniques to easily check a tilt and to obtain an accurate tilt correction value are required.

SUMMARY OF THE INVENTION

Exemplary embodiments address at least the above problems and/or disadvantages and other disadvantages not described above. Also, the exemplary embodiments are not limited to overcoming the disadvantages described above, and an exemplary embodiment may provide other utilities other than overcoming any of the problems described above.

Additional features and utilities of the present general inventive concept will be set forth in part in the description which follows and, in part, will be obvious from the description, or may be learned by practice of the general inventive concept.

The exemplary embodiments provide a tilt check apparatus to easily check a tilt and obtain an accurate tilt correction value, and a method thereof.

Exemplary embodiments of the present inventive concept provide a tilt check apparatus which checks a lens module including a sensor and a lens. The tilt check apparatus may include: a light-emitting part which diffuses and output light to check a tilt of the lens module; a reflector which reflects the diffused light; an interface which, if the reflected light is sensed by the sensor of the lens module, receives the sensed result from the sensor; and a detector which detects depth information by using the sensed result received through the interface and detects a tilt state between the lens and the sensor based on the depth information.

The detector may detect a depth of a central area of the sensor and depths of corner areas of the sensor among the depth information.

The detector may calculate an average value of the detected depths, calculate a difference between the average value and the depths, and compare the calculated values to detect the tilt state.

The tilt check apparatus may further include: a storage which stores the depth information and the tilt state; and an output part which outputs the depth information and the tilt state.

The light-emitting part may output light having a phase difference of 90° a plurality of times.

Exemplary embodiments of the present inventive concept also provide a tilt check method of checking a lens module including a sensor and a lens. The tilt check method may include: diffusing and outputting light to check a tilt of the lens module; reflecting the diffused light; if the reflected light is sensed by the sensor of the lens module, receiving the sensed result from the sensor; and detecting depth information by using the received sensed result and detecting a tilt state between the lens and the sensor based on the depth information.

A depth of a central area of the sensor and depths of corner areas of the sensor may be detected among the depth information.

An average value of the detected depths may be calculated, a difference between the average value and the depths may be calculated, and the calculated values may be compared to detect the tilt state.

The tilt check method may further include: storing the depth information and the tilt state; and displaying the depth information and the tilt state.

Light having a phase difference of 90° may be output a plurality of times.

As described above, according to various exemplary embodiments of the present general inventive concept, a tilt may be easily checked in a process of combining a lens and a sensor. Also, an accurate correction value may be obtained to improve efficiency of the process of combining the lens and the sensor.

Exemplary embodiments of the present inventive concept also provide a tilt check apparatus, comprising: a light emitting part to output diffused light to check a tilt of a lens module; a reflector to reflect the diffused light; a lens module to receive the reflected light and determine depth differences of the light rays of the reflected light; and a detector to calculate an average value of the determined depths differences, calculate a difference between the average value of the depth differences and the depth differences, and compares the calculated values to detect the tilt state.

In an exemplary embodiment, the light rays are determined for depth difference at a central area of the reflected light and depth differences of corner areas of the reflected light.

In an exemplary embodiment, the lens module comprises: a lens to receive the reflected light; and a sensor to sense the central area and the corner areas of the reflected light which pass through the lens.

In an exemplary embodiment, the tilt check apparatus further comprises: a storage which stores the depth difference information and the tilt state; and an output part which outputs the depth difference information and the tilt state.

Exemplary embodiments of the present inventive concept also provide a method of checking a tilt of a lens module, comprising: outputting a diffused light; reflecting the diffused light; receiving the reflected light and determining depth differences of the light rays of the reflected light; and calculating an average value of the determined depth differences, calculating a difference between the average value of the depth differences and the depth differences, and comparing the calculated values to detect a tilt state.

In an exemplary embodiment, the determining depth differences of the light rays of the reflected light is performed with a lens and a sensor.

In an exemplary embodiment, the light rays are determined for depth difference at a central area of the reflected light and depth differences of corner areas of the reflected light.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
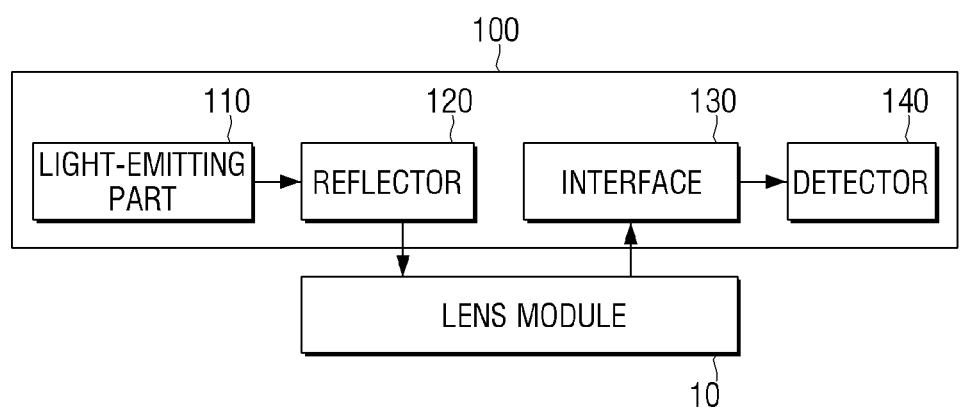
FIGS. 1 and 2 are block diagrams illustrating a structure of a tilt check apparatus according to an exemplary embodiment of the present general inventive concept.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 2:
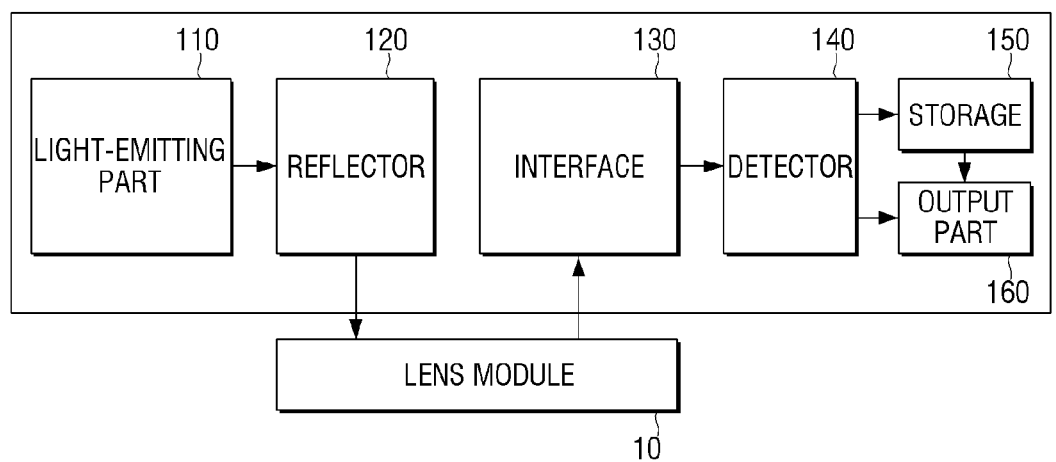

FIGS. 1 and 2 are block diagrams illustrating a structure of a tilt check apparatus 100 according to an exemplary embodiment of the present general inventive concept.

Referring to FIG. 1, the tilt check apparatus 100 includes a light-emitting part 110, a reflector 120, an interface 130, and a detector 140. The light-emitting part 110 diffuses and outputs light to check a tilt of a lens module 10 including a lens and a sensor. The light-emitting part 110 may include a light source, which outputs the light, and the lens and a diffuser which collect and diffuse the light. The reflector 120 reflects the diffused light onto the lens module 10. The lens module 10 is connected to the interface 130 of the tilt check apparatus 100.

The light reflected from the reflector 120 is input into the lens module 10. A depth sensor of the lens module 10 senses the input light and transmits the sensed result to the tilt check apparatus 100. The interface 130 receives the sensed result of the depth sensor of the lens module 10 and transmits the sensed result to the detector 140.

The detector 140 detects depth information by using the sensed result received through the interface 130. The detector 140 also detects a tilt state between the lens and the sensor based on the depth information. The detector 140 may also detect depths of the depth information from five areas, i.e., from a central area and corner areas of the sensor. The detector 140 may calculate an average value of the depths detected from the five areas to calculate a difference between the calculated average value and the detected depths and compares the calculated values to detect the tilt state. Areas from which depths are detected are not limited to the above-mentioned areas. Therefore, a depth may be detected from another area, and the another area may be added to the five areas to detect depths from six or more areas. Referring to FIG. 2, the tilt check apparatus 100 may further include a storage 150 and an output part 160.

The storage 150 stores the detected depth information and the tilt state. The storage 150 may also store a program which is to drive the tilt check apparatus 100. For example, the storage 150 may include a read only memory (ROM), a random access memory (RAM), or a memory card (e.g. a secure digital (SD) card or a memory stick) removable from the tilt check apparatus 100. The storage 150 may also include a non-volatile memory, a volatile memory, a hard disk drive (HDD) or a solid state drive (SSD).

The output part 160 outputs the detected depth information and the tilt state. The displayed depth information may be a distance between the central area and the corner areas of the sensor and the reflector 120. The tilt state may be a difference between the average value of the depths of the central and corner areas and the depths of the central and corner areas. The output part 160 may be realized as various types of display units such as a liquid crystal display (LCD) panel, a plasma display panel (PDP), an organic light-emitting diode (OLED), a vacuum fluorescent display (VFD), a field emission display (FED), an electro luminescence display (ELD), and so on. Alternatively, the output part 160 may be a printer.

The structure of the tilt check apparatus 100 of the lens module 10 will now be described in detail.

Figure 3:
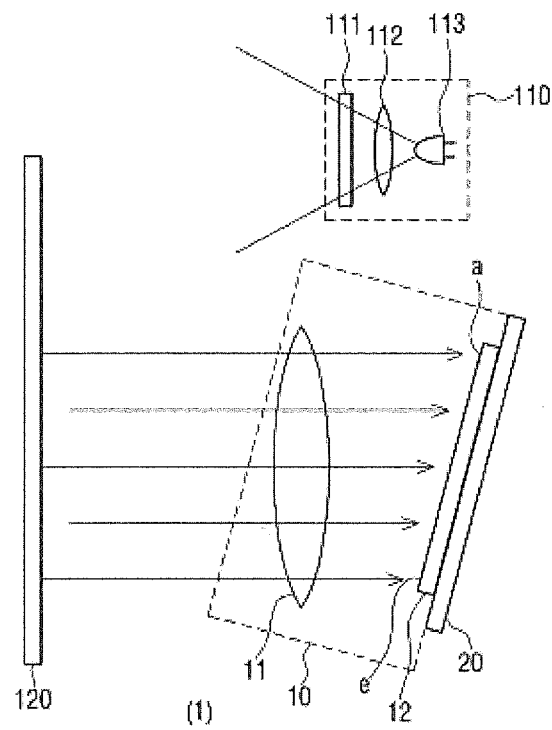
FIG. 3 is a view illustrating a structure of a tilt check apparatus according to an exemplary embodiment of the present general inventive concept.
Figure 3:
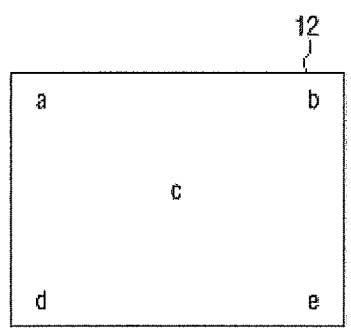

FIG. 3 is a view illustrating a structure of a tilt check apparatus according to an exemplary embodiment of the present general inventive concept.

Referring to illustration (1) of FIG. 3, the light-emitting part 110 includes a diffuser 111, a lens 112, and a light source 113. The light source 113 may be a light diode. The light diode is also referred to as a photodiode and may output light having a particular frequency of an infrared area. The lens 112 accumulates the light output from the light diode. The diffuser 111 diffuses the light accumulated through the lens 112. For example, the diffuser 111 may be formed of a board made of glass fiber or a metal net. The light-emitting part 110 is disposed on the same side as the lens module 10 with respect to the reflector 120 to be checked by the tilt check apparatus 100, i.e., disposed on an opposite side to the reflector 120, to output the light to the reflector 120.

The reflector 120 is disposed opposite to the light-emitting part 110 and the lens module 10 to reflect the light output from the light-emitting part 110 to the lens module 10. For example, the reflector 120 may be a white wall. The light reflected from the reflector 120 may be uniformly incident onto the lens module 10.

The lens module 10 to be checked includes a lens 11 and a sensor 12 and may be connected to a camera main board 20 to be installed on a check board (not shown). The camera main board 20 provides a control mode to control the lens module 10 and drives the lens module 10. The camera main board 20 may also include a terminal or a connector which is connected to the interface 130 of the tilt check apparatus 100 to transmit sensed data to the tilt check apparatus 100.

The lens module 10 may include only a depth sensor or may include a sensor which senses a depth and a color. The depth sensor may sense light having a particular frequency, e.g., light having a wavelength of 850 nm of an infrared area. The light reflected from the reflector 120 passes through the lens 11 and then is sensed by the sensor 12.

As shown in illustration (1) of FIG. 3, if the sensor 12 is tilted with respect to the lens 11, amounts and phases of light sensed in areas a and e of the sensor 12 are different.

A process of detecting a depth and a tilt state by using amounts of light will be first described, and then a process of detecting the depth and the tilt state by using phases will be described. Illustration (2) of FIG. 3 illustrates a front of the sensor 12. Referring to illustration (2) of FIG. 3, areas a and b are farthest away from the reflector 120, and thus amounts of light sensed from the areas a and b are the smallest. Areas d and e are closest to the reflector 120, and thus amounts of light sensed from the areas d and e are the largest. The results sensed by the sensor 120 are transmitted to the detector 140 through the interface 130. The detector 140 detects depth information from the areas a, b, d and e by using an amount of light sensed from a predetermined area to detect depth information and detects whether the sensor 12 is tilted. The detector 140 detects the depth information of the areas a, b, d, and e and calculates an average value of depths of the areas a, b, d, and e. The detector 140 may calculate a difference between the average value and the depths to detect a tilt state.

For example, depths of the areas a and b are each 1002 mm, a depth of the area c is 1000 mm, and depths of the areas d and e are each 998 mm. An average value of depths of five areas is 1000 mm. Therefore, tilt states of the areas a and b are each +2 mm, a tilt state of the area c is 0 mm, and tilt states of the areas d and e are each −2 mm. The detected tilt states are tilt corrections. Therefore, according to an exemplary embodiment of the present general inventive concept, the tilt corrections may be quantitatively detected. An adjustment apparatus (e.g., an adjustment screw) of the lens module 10 may be adjusted based on the detected tilt corrections to correct a tilt. For example, a worker knows how to adjust the adjustment apparatus to adjust a tilt of 1 mm, and thus efficiency of a tilt adjusting work may be improved.

A method of checking a tilt state of the sensor 12 when the lens 11 is perpendicular to the ground is illustrated in FIG. 3. In general, the lens 11 of the lens module 10 is combined with a barrel. The barrel may be placed on the check board of the tilt check apparatus 100.

When an imaging device is developed, several processes are performed to combine modules or adjust a setting value. Therefore, whether a combination error occurs between the barrel and the lens may be detected and adjusted in another process. Also, if the barrel is placed on the check board, the tilt check apparatus 100 may include a level device on the check board, and the checker may adjust a level state of the check board to keep a level state of the barrel or lens module 10.

Since the check board may be adjusted to guarantee the level state when the combination error does not occur between the barrel and the lens 11, the lens 11 may be kept perpendicular to the ground. The lens 11 may be kept perpendicular to the ground, and thus the tilt state of the sensor 12 may be detected. Therefore, the tilt states of the lens 11 and the sensor 12 may be adjusted by using the detected tilt corrections.

A process of detecting a depth and a tilt state by using a phase of light will now be described.

Figure 4:
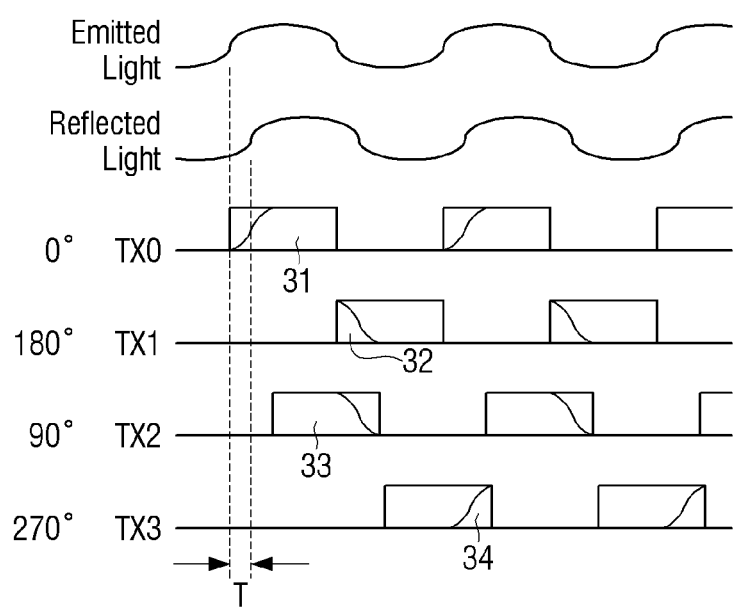
FIG. 4 is a view illustrating a method of calculating a depth by using a phase of light according to an exemplary embodiment of the present general inventive concept.

FIG. 4 is a view illustrating a method of calculating a depth by using a phase of light according to an exemplary embodiment of the present general inventive concept.

The light source 113 outputs light every predetermined period. The period at which the light source 113 outputs the light synchronizes with a period at which the sensor 112 performs sensing. A waveform of the light output from the light source 113 and a waveform of light reflected and sensed by the sensor 12 are illustrated in FIG. 4. The output light has a phase difference from the reflected light by time T due to a distance. For example, the light source 113 outputs the light with changing the phase at 0°, 90°, 180°, and 270°. In FIG. 4, when the light output from the light source 113 has the phase of 0°, the light has a waveform 31. When the light has the phase of 180°, the light has a waveform 32. When the light has the phase of 90°, the light has a waveform 33. When the light has the phase of 270°, the light has a waveform 34. If areas of the waveforms of the light output at the phases are calculated, and a relation between the areas is used, a delay time T occurring due to a phase difference may be calculated. A distance and a time between the reflector 120 and the sensor 12 may be calculated, and thus a depth may be detected. In other words, the light-emitting part 110 may output light having a phase difference of 90° four times to detect a depth.

The phase difference 90° of the output light is only an exemplary embodiment. Therefore, a phase of light may be variously set according to an algorithm for calculating a depth, a check method, a check apparatus, etc. The number of times outputting light is not limited to four times, and thus may be appropriately set according to a phase difference of the light.

In the above-described process, effects of the lens 12 or the diffuser 111 may be pre-measured and pre-calculated to calculate a correction value, and the calculated correction value may be stored in the detector 140. The detector 140 may apply the stored correction value to detect the depth. The above-described method of detecting the depth by using the phase is only an exemplary embodiment, and thus a depth may be detected by using phases according to various methods.

Also, as described above, the method of detecting the depth is classified into a method using an amount of light and a method using a phase. However, when the detector 140 actually detects a depth, both the methods may be applied to detect the depth.

Figure 5:
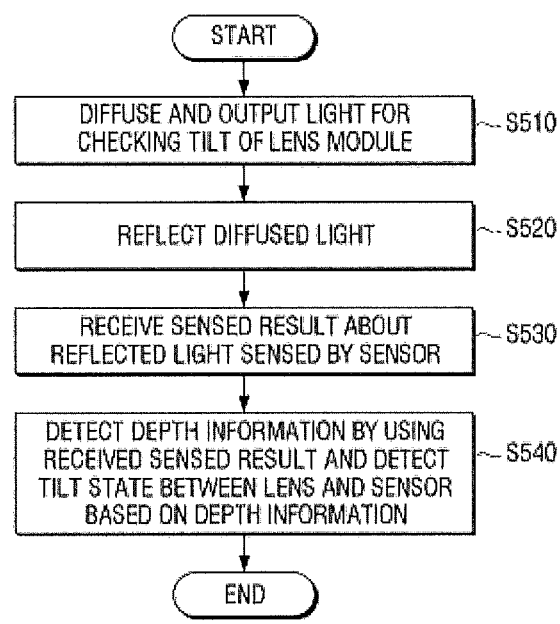
FIG. 5 is a flowchart illustrating a tilt check method according to an exemplary embodiment of the present general inventive concept.

FIG. 5 is a flowchart illustrating a tilt check method according to an exemplary embodiment of the present general inventive concept.

The lens module 10 including a lens 11 and a sensor 12 are installed on a check board 20, and the sensor 12 is set to receive depth information. In operation S510, the light-emitting part 110 diffuses and outputs light to detect a tilt of the lens module 10. The light output from the light-emitting part 110 has a particular frequency of an infrared area. In operation S520, the reflector 120 reflects the diffused light.

The light reflected from the reflector 120 is incident onto the sensor 12 of the lens module 10, and the sensor 12 senses the light and outputs the sensed result. In operation S530, the interface 130 (FIG. 1) receives the sensed result if the reflected light is sensed by the sensor 12 of the lens module 10.

In operation S540, the detector 140 detects depth information by using the sensed result including an amount of the received light and phase information of the light and detects a tilt state between the lens 11 and the sensor 12 based on the depth information. The detailed tilt check method is as described above and thus will be omitted herein.

Figure 6:
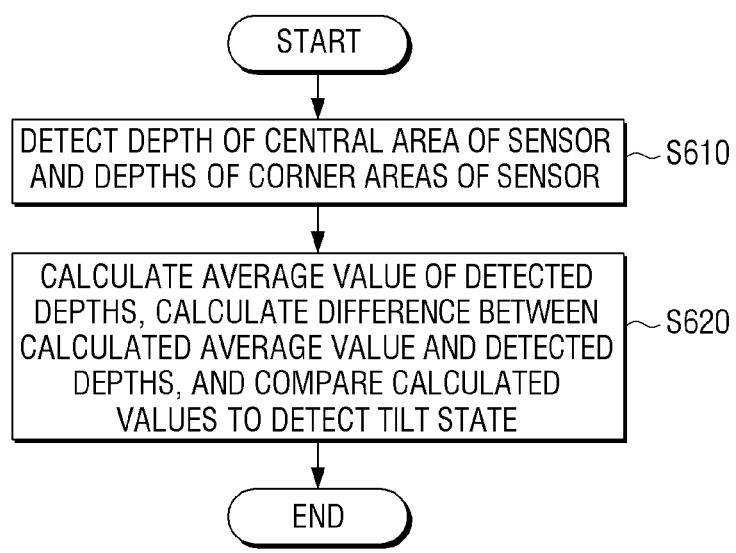
FIG. 6 is a flowchart illustrating a method of detecting a depth according to an exemplary embodiment of the present general inventive concept.

FIG. 6 is a flowchart illustrating a method of detecting a depth according to an exemplary embodiment of the present general inventive concept.

Referring to FIG. 6, in operation S610, the detector 140 detects a depth of a central area of a sensor 12 and depths of corner areas of the sensor 12. For example, depth information may be detected in the unit of mm.

In operation S620, the detector 140 calculates an average value of the detected depths, calculates a difference between the average value and the depths, and compares the calculated values to detect a tilt state. For example, the tilt state may be detected by using a difference value of mm between an average value calculated from areas and depths calculated from the areas. The detected difference value may be a tilt correction. The tilt correction may be stored in the storage 150 or may be output to the output part 160.

The tilt check method according to the above-described various exemplary embodiments may be embodied as a program and provided to a tilt check apparatus.

For example, there may be provided a non-transitory computer readable medium which stores a program performing the following operations: if reflected light is sensed by a sensor of a lens module, receiving the sensed result from the sensor; detecting depth information by using the received sensed result and detecting a tilt state between a lens and the sensor based on the depth information or performing operations: detecting a depth of a central area of the sensor and depths of corner areas of the sensor among the depth information; and calculating an average value of the depths to calculate a difference between the average value and the depths and comparing the calculated values to detect a tilt state.

The non-transitory computer readable medium refers to a medium which does not store data for a short time such as a register, a cache memory, a memory, or the like, but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A tilt check apparatus to check a lens module comprising a sensor and a lens, the tilt check apparatus comprising:
 a light-emitting part to diffuse light and output the diffused light;
 a reflector to reflect the light output by the light-emitting part to the sensor so that the sensor senses the reflected light and thereby produces a sensed result that includes at least one of an amount of the light sensed by the sensor and a phase information of the light sensed by the sensor;
 an interface that is detachably connected to the lens module to receive the sensed result; and
 a detector to detect depth information based on said at least one of the amount of the light sensed by the sensor and the phase information of the light sensed by the sensor included in the sensed result received by the interface, and to detect a tilt state between the lens and the sensor based on the depth information.

2. The tilt check apparatus of claim 1, wherein the depth information detected by the detector includes a depth of a central area of the sensor and depths of corner areas of the sensor.

3. The tilt check apparatus of claim 2, wherein the detector calculates an average value of the depth of the central area of the sensor and the depths of the corner areas of the sensor, calculates differences between the calculated average value and the depth of the central area of the sensor and the depths of the corner areas of the sensor, and compares the calculated differences to detect the tilt state.

4. The tilt check apparatus of claim 1, further comprising:
 a storage which stores the depth information and the tilt state; and
 an output part which outputs the depth information and the tilt state.

5. The tilt check apparatus of claim 1, wherein the light output by the light-emitting part has a preset phase difference that is output a plurality of times.

6. A tilt check method of checking a lens module comprising a sensor and a lens, the tilt check method comprising:
 diffusing a light;
 outputting the diffused light;
 reflecting the outputted light to the sensor;
 receiving from the sensor a sensed result of the light sensed by the sensor, the sensed result including at least one of an amount of the light sensed by the sensor and a phase information of the light sensed by the sensor;
 detecting depth information based on said at least one of the amount of the light sensed by the sensor and the phase information of the light sensed by the sensor included in the sensed result received by said receiving; and
 detecting a tilt state between the lens and the sensor based on the depth information.

7. The tilt check method of claim 6, wherein the depth information includes a depth of a central area of the sensor and depths of corner areas of the sensor.

8. The tilt check method of claim 7, wherein said detecting of the depth information further comprises:
 calculating an average value of the depth of the central area of the sensor and the depths of the corner areas of the sensor;
 calculating differences between the calculated average value and the depth of the central area of the sensor and the depths of the corner areas of the sensor; and
 comparing the calculated differences,
 wherein said detecting of the tilt state is based on said comparing of the calculated differences.

9. The tilt check method of claim 6, further comprising:
 storing the depth information and the tilt state; and
 displaying the depth information and the tilt state.

10. The tilt check method of claim 6, wherein said outputting outputs light having a preset phase difference a plurality of times.

* * * * *